United States Patent
Lewis et al.

(10) Patent No.: US 10,558,329 B2
(45) Date of Patent: Feb. 11, 2020

(54) TECHNIQUES FOR INSERTION OF CONTENT INTO CHAT COMMUNICATION

(71) Applicant: GOOGLE LLC, Mountain View, CA (US)

(72) Inventors: Justin Lewis, Marina del Rey, CA (US); Ruxandra Georgiana Davies, Santa Monica, CA (US)

(73) Assignee: GOOGLE LLC, Mountain View, CA (US)

(*) Notice: Subject to any disclaimer, the term of this patent is extended or adjusted under 35 U.S.C. 154(b) by 200 days.

(21) Appl. No.: 15/299,554

(22) Filed: Oct. 21, 2016

(65) Prior Publication Data

US 2017/0038927 A1  Feb. 9, 2017

Related U.S. Application Data

(63) Continuation of application No. 14/462,120, filed on Aug. 18, 2014, now Pat. No. 9,477,375.

(51) Int. Cl.
*G06F 3/0482* (2013.01)
*G06F 3/0481* (2013.01)
*H04L 12/58* (2006.01)
*H04L 29/06* (2006.01)

(52) U.S. Cl.
CPC ........ *G06F 3/0482* (2013.01); *G06F 3/04817* (2013.01); *H04L 51/046* (2013.01); *H04L 29/06027* (2013.01)

(58) Field of Classification Search
CPC .................................................. G06F 3/0482
USPC ........................................................ 715/733
See application file for complete search history.

(56) References Cited

U.S. PATENT DOCUMENTS

| | | | |
|---|---|---|---|
| 6,489,968 B1 * | 12/2002 | Ortega | G06F 3/0482 345/594 |
| 7,072,941 B2 * | 7/2006 | Griffin | H04L 12/1827 709/204 |
| 7,533,144 B2 | 5/2009 | Kassab | |
| 8,271,583 B2 | 9/2012 | Stolorz et al. | |
| 8,352,873 B2 | 1/2013 | Craig et al. | |
| 8,464,167 B2 * | 6/2013 | Saund | H04L 51/04 715/758 |
| 9,477,375 B1 * | 10/2016 | Lewis | G06F 3/04817 |

(Continued)

*Primary Examiner* — William D Titcomb
(74) *Attorney, Agent, or Firm* — Lowenstein Sandler LLP

(57) ABSTRACT

A computer-implemented technique can include providing, at a computing device including one or more processors, a chat application user interface for display. The chat application user interface can be associated with a real-time chat communication between a user of the computing device and another user of another computing device via a chat application. The technique can also include determining that the user of the computing device is interacting with a non-chat application other than the chat application. Additionally, the technique can include determining shareable content of the non-chat application and modifying the chat application user interface to include a selectable indicator of the shareable content. The technique can also include receiving a selection of the selectable indicator by the user, and in response to receiving the selection, transmitting the shareable content of the non-chat application to the other user of the other computing device via the chat application.

20 Claims, 6 Drawing Sheets

(56) References Cited

U.S. PATENT DOCUMENTS

| | | | | |
|---|---|---|---|---|
| 2004/0015547 | A1* | 1/2004 | Griffin | H04L 12/1827 709/204 |
| 2004/0049539 | A1* | 3/2004 | Reynolds | G06Q 10/10 709/203 |
| 2004/0205091 | A1* | 10/2004 | Mulcahy | G06F 3/0481 |
| 2005/0204309 | A1* | 9/2005 | Szeto | G06F 3/0482 715/811 |
| 2008/0005240 | A1* | 1/2008 | Knighton | G06Q 10/107 709/204 |
| 2010/0242074 | A1* | 9/2010 | Rouse | H04L 51/32 725/100 |
| 2010/0325307 | A1* | 12/2010 | Roos | G06F 15/16 709/234 |
| 2012/0204113 | A1* | 8/2012 | Shiplacoff | G06F 3/0482 715/733 |
| 2014/0229154 | A1* | 8/2014 | Leydon | G06F 17/289 704/2 |
| 2014/0229156 | A1* | 8/2014 | Leydon | G06F 17/289 704/2 |
| 2014/0298257 | A1* | 10/2014 | Grandhi | G06F 3/0484 715/808 |

* cited by examiner

TECHNIQUES FOR INSERTION OF CONTENT INTO CHAT COMMUNICATION

CROSS-REFERENCE TO RELATED APPLICATIONS

This application is a continuation of U.S. patent application Ser. No. 14/462,120, filed on Aug. 18, 2014. The entire disclosure of the above application is incorporated herein by reference.

FIELD

The present disclosure relates to electronic communication techniques and, more particularly, to an improved technique for inserting content into an electronic communication.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computing devices are being more and more frequently utilized for electronic communication. For example only, a user may utilize his/her mobile phone to communicate with another user via an instant message, short messaging service (SMS) or other chat application. Such chat communication applications typically allow a user to enter text, e.g., via a keyboard associated with the computing device, which can be transmitted as a message to another user. The insertion of non-text, such as an image, in a chat message, if available at all, is cumbersome for the user. It would be beneficial to provide an improved technique for inserting non-text content in an electronic communication in a simple and straight-forward manner.

SUMMARY

A computer-implemented technique is described. The technique can include providing, at a computing device including one or more processors, a chat application user interface for display. The chat application user interface can be associated with a real-time chat communication between a user of the computing device and another user of another computing device via a chat application. The chat application user interface can include (i) a textual input portion configured to receive text input from the user, and (ii) a selectable text transmit indicator configured to cause transmission of the text input in the textual input portion to the other user when the text transmit indicator is selected by the user. The technique can also include determining, at the computing device, whether the user is interacting with a non-chat application. When the user is interacting with a non-chat application, the technique can include determining with which particular non-chat application of a plurality of actively executing non-chat applications the user is interacting, determining shareable content of the particular non-chat application, and modifying the selectable text transmit indicator to include a selectable indicator of the shareable content.

The technique can also include receiving a selection of the selectable indicator by the user, wherein the selectable indicator comprises a thumbnail image representative of the shareable content. Further, the technique can include, in response to receiving the selection, transmitting, from the computing device, the shareable content of the non-chat application to the other user of the other computing device via the chat application.

In some embodiments, another computer-implemented technique is described. The technique can include providing, at a computing device including one or more processors, a chat application user interface for display. The chat application user interface can be associated with a real-time chat communication between a user of the computing device and another user of another computing device via a chat application. The technique can also include determining, at the computing device, that the user of the computing device is interacting with a non-chat application other than the chat application. Additionally, the technique can include determining, at the computing device, shareable content of the non-chat application and modifying, at the computing device, the chat application user interface to include a selectable indicator of the shareable content. The technique can also include receiving, at the computing device, a selection of the selectable indicator by the user, and in response to receiving the selection, transmitting, from the computing device, the shareable content of the non-chat application to the other user of the other computing device via the chat application.

In some variations, determining that the user of the computing device is interacting with the non-chat application can comprise receiving a user input with respect to the non-chat application. In some variations, the selectable indicator can comprise a thumbnail image representative of the shareable content. Further, in some variations, the shareable content can comprise a Uniform Resource Locator for a webpage. The chat application and the non-chat application can be executed by a web browser at the computing device. Further, the chat application user interface can include a textual input portion configured to receive text input from the user, and a selectable text transmit indicator configured to cause transmission of the text input in the textual input portion to the other user when the text transmit indicator is selected.

In some variations, modifying the chat application user interface to include the selectable indicator of the shareable content can comprise replacing the selectable text transmit indicator with the selectable indicator of the shareable content when no text is present in the textual input portion. In various features, the technique can further include replacing the selectable indicator of the shareable content with the selectable text transmit indicator when text is input to the textual input portion by the user.

In certain implementations, determining that the user of the computing device is interacting with the non-chat application can include: executing a plurality of actively executing non-chat applications, determining a particular one of the plurality of actively executing non-chat applications with which the user is interacting, and assigning the particular one of the plurality of actively executing non-chat applications as the non-chat application with which the user is interacting.

In some embodiments, the non-chat application can comprise a web browser, the shareable content can comprise a video playing in the web browser, and transmitting the shareable content of the non-chat application to the other user of the other computing device via the chat application can comprise embedding the video in the chat application. Also, the chat application can be executed by a web browser in some implementations.

In further embodiments, a computing device is disclosed. The computing device can include one or more processors and a non-transitory, computer readable medium storing instructions that, when executed by the one or more processors, cause the computing device to perform operations. The operations can include any one or more of the techniques described above.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As mentioned above, a chat application executing on a computing device can be used to permit the user of the computing device to electronically communicate with another user, such as a friend, colleague or acquaintance. Such real-time chat communications can include text messages sent from a sender to a recipient or a group of recipients. It is difficult, however, for a user to insert non-text content into such a chat communication. For example only, when a user desires to insert an image into a chat communication, she/he may be required to select or "click" an attachment button or select an "attach" option in a menu, then navigate through a large selection of items, find and select the desired image, which causes the image to be attached to a message. Furthermore, if a user desires to share a web page with another user in a chat communication, the user typically is required to go to the web browser, copy the uniform resource locator (URL) associated with the web page, and then past the URL into a text input portion of the chat application.

The present disclosure provides an improved technique for inserting shareable content into a communication of a chat application. A user may have an active chat communication with another user, while also performing other activities on her/his associated computing device. For example only, a user may have an active instant message application executing on his/her computing device, while also browsing the Internet via a web browser. During his/her browsing activities, the user may find an interesting image or video that he/she wishes to share with the other user with whom she/he is communicating. The present disclosure describes a technique that permits and greatly simplifies a process for inserting such shareable content into an ongoing communication session.

The present disclosure provides techniques for determining that a user is interacting with a non-chat application, such as, a web browser application in the above example. The techniques further describe determining the shareable content of the particular non-chat application. In the above example, the shareable content may include the image and/or video that the user is currently viewing. The techniques can also provide for the modification of the user interface of the chat application to include a selectable indicator (a thumbnail image, etc.) representative of the shareable content. The user can simply and easily share the shareable content of the non-chat application by selecting the selectable indicator, which results in the shareable content being transmitted by the user's computing device to the other user.

Figure 1:
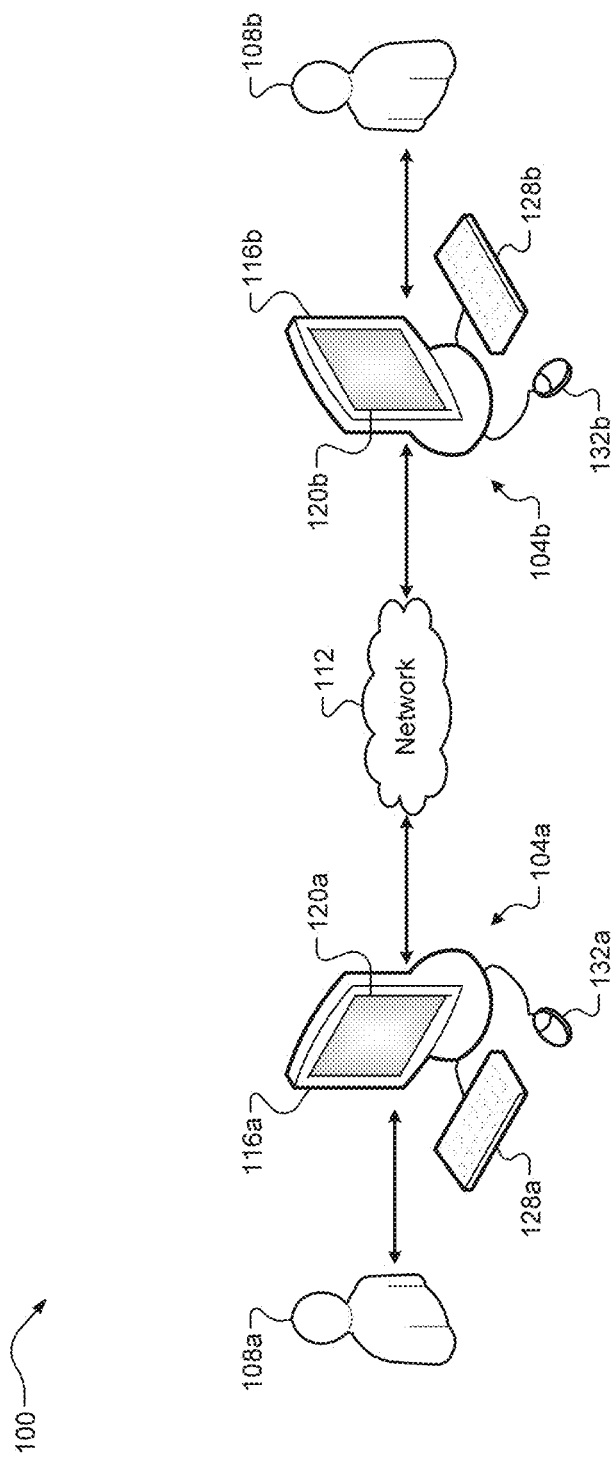
FIG. 1 is a diagram of a computing system including an example computing device according to some implementations of the present disclosure.

Referring now to FIG. 1, a diagram of an example computing system 100 is illustrated. The computing system 100 can include computing devices 104a and 104b (referred to herein individually and collectively as "computing device(s) 104") that are operated by users 108a and 108b (referred to herein individually and collectively as "user(s) 108"), respectively. The computing devices 104 can be configured to communicate with each other via a network 112. Examples of the computing devices 104 include desktop computers, laptop computers, tablet computers, and mobile phones. While two computing devices 104 are illustrated, it should be appreciated that the computing network 100 can include any number of computing devices 104 that can communicate with each other for a group chat session. The network 112 can include a local area network (LAN), a wide area network (WAN), e.g., the Internet, or a combination thereof.

In some implementations, the computing devices 104 include peripheral components. The computing devices 104 include displays 116a and 116b (referred to herein individually and collectively as "display(s) 116") having display areas 120a and 120b (referred to herein individually and collectively as "display area(s) 120"), respectively. In some implementations, the displays 116 are touch displays. The computing devices 104 can also include other input devices, such as mice 124a and 124b (referred to herein individually and collectively as "mouse/mice 124") and keyboards 128a and 128b (referred to herein individually and collectively as "keyboard(s) 128").

Figure 2:
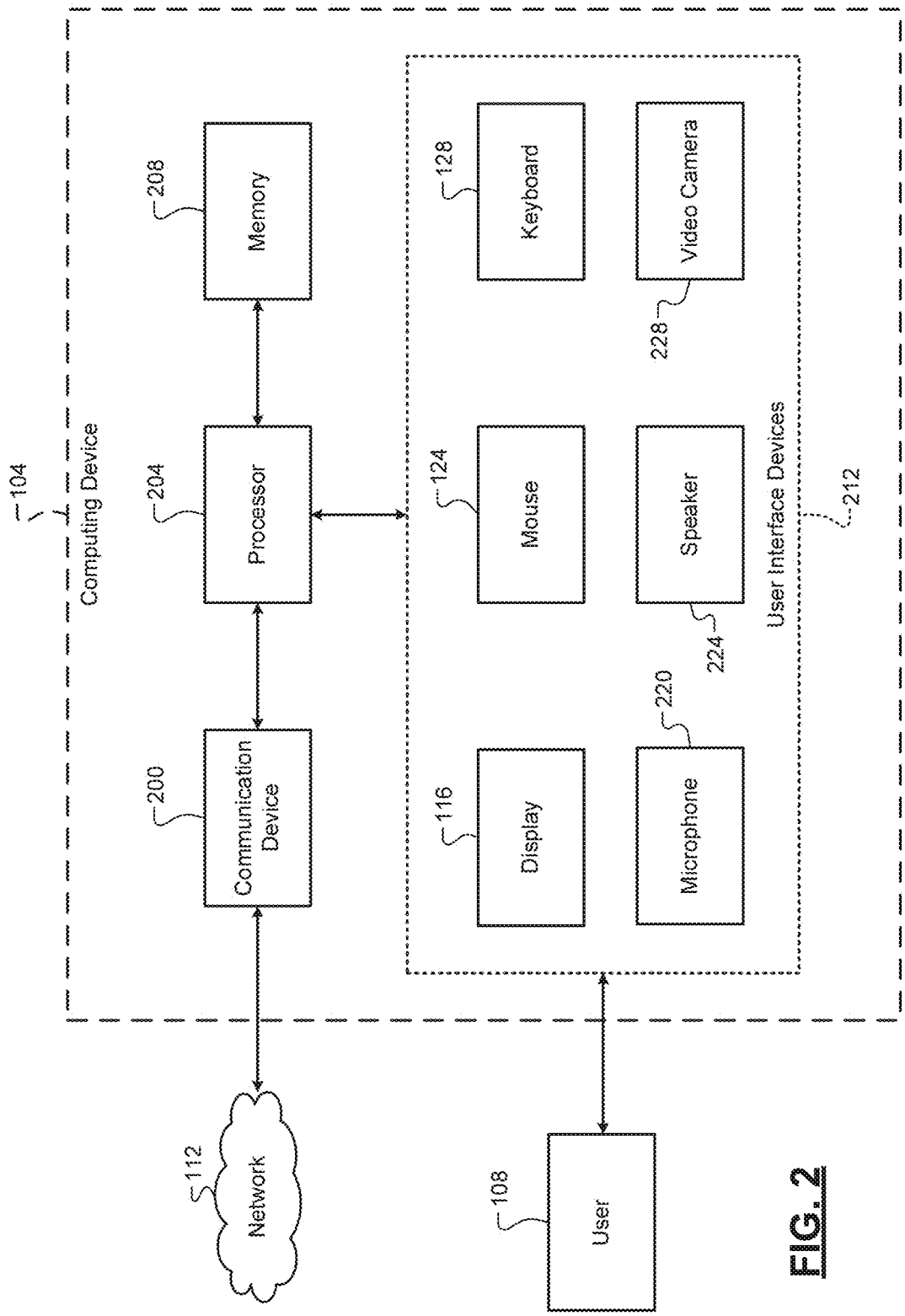
FIG. 2 is a functional block diagram of the example computing device of FIG. 1.

Referring now to FIG. 2, a functional block diagram of one example computing device 104 is illustrated. While a single computing device 104 and its associated user 108 and example components are described and referred to hereinafter, it should be appreciated that both computing devices 104 can have the same or similar configuration and thus can operate in the same or similar manner. The computing device 104 can include a communication device 200, a processor 204, and a memory 208. The computing device 104 can also include the display 116, the mouse 124, and the keyboard 128 (referred to herein individually and collectively as "user interface device(s) 212"). The user interface devices 212 are configured for interaction with the user 108. In some implementations, the user interface devices 212 can further include a microphone 220, a speaker 224 and a video camera 228.

The communication device 200 is configured for communication between the processor 204 and other devices, e.g., the other computing device 104, via the network 112. The communication device 200 can include any suitable communication components, such as a transceiver. Specifically, the communication device 200 can transmit a request to initiate a chat communication session and can provide a response to this request to the processor 204. The communication device 200 can then handle transmission and receipt of the various communications between the computing devices 200 during the chat session. The memory 208 can be configured to store information at the computing device 104, such as chat settings for the user 108. The memory 208 can be any suitable storage medium (flash, hard disk, etc.).

The processor 204 can be configured to control operation of the computing device 104. It should be appreciated that the term "processor" as used herein can refer to both a single processor and two or more processors operating in a parallel or distributed architecture. The processor 204 can be configured to perform general functions including, but not limited to, loading/executing an operating system of the computing device 104, controlling communication via the communication device 200, and controlling read/write operations at the memory 208. The processor 204 can also be configured to perform specific functions relating to at least a portion of the present disclosure including, but not limited to, loading/executing a chat application and one or more non-chat applications at the computing device 104, initiating/controlling the chat communication session, and controlling the display 116, including creating and modifying the chat application user interface, which is described in greater detail below.

Figure 3:
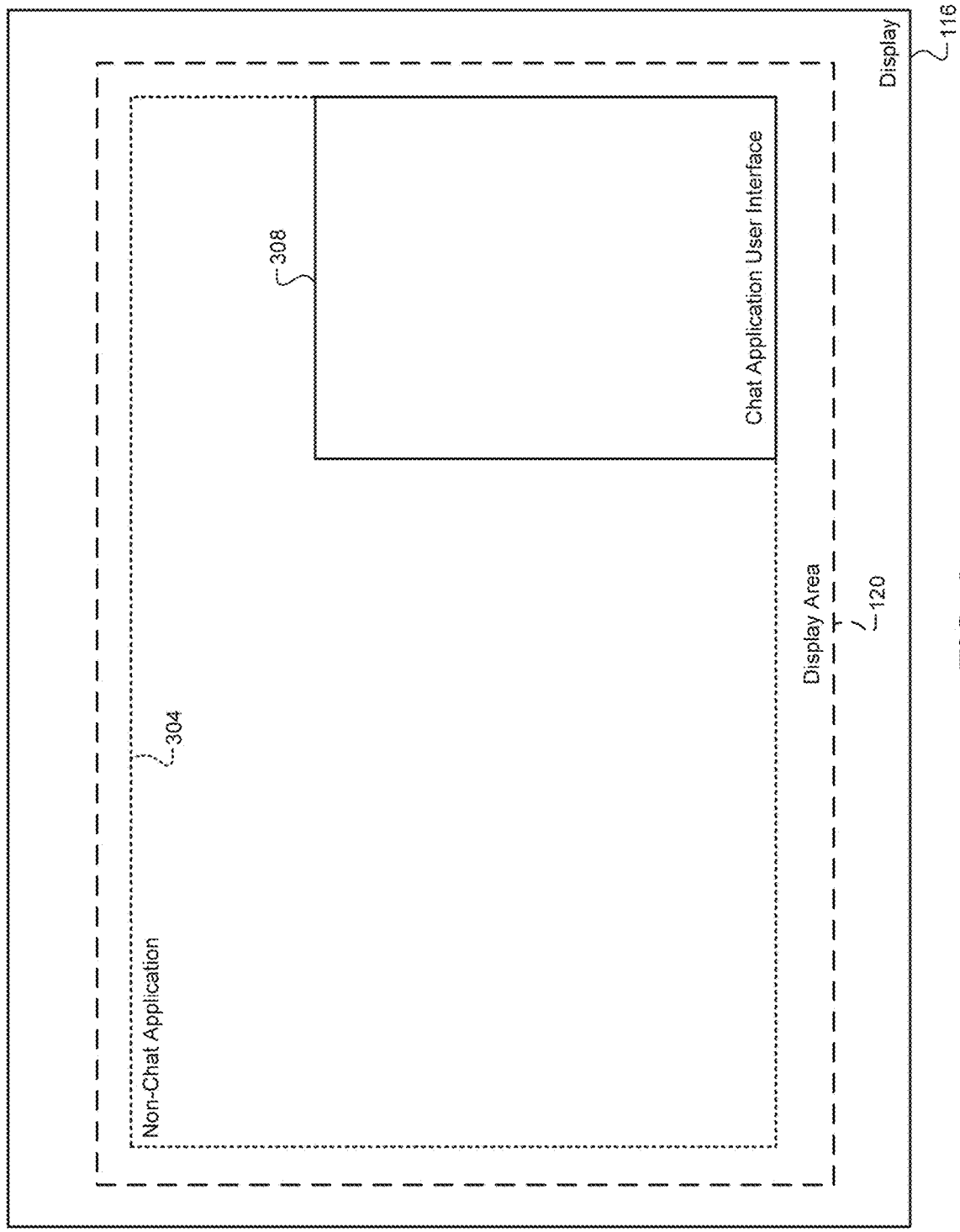
FIG. 3 is a view of a display of the example computing device of FIG. 1. displaying a chat application user interface according to some implementations of the present disclosure.

Referring now to FIG. 3, a diagram of the display 116 of an example computing device 104 is illustrated. The computing device 104 can load and execute a non-chat application 304, which is illustrated as a window with respect to the display area 120 of the display 116. While a non-chat application 304 is specifically discussed, it should be appreciated that the non-chat application could be initiated or executed by an operating system or another application, such as a web browser. The non-chat application 304 may not occupy the entire display area 120, e.g., due to toolbars or other borders (not shown). The non-chat application 304 can be configured to initiate the chat communication session, which includes displaying a chat application user interface 308. As illustrated, the chat application user interface 308 occupies a portion of the displayed area of the non-chat application 304. It should be appreciated, however, that the chat application user interface 308 could occupy a partially or completely separate portion of the display area 120.

Figure 4:
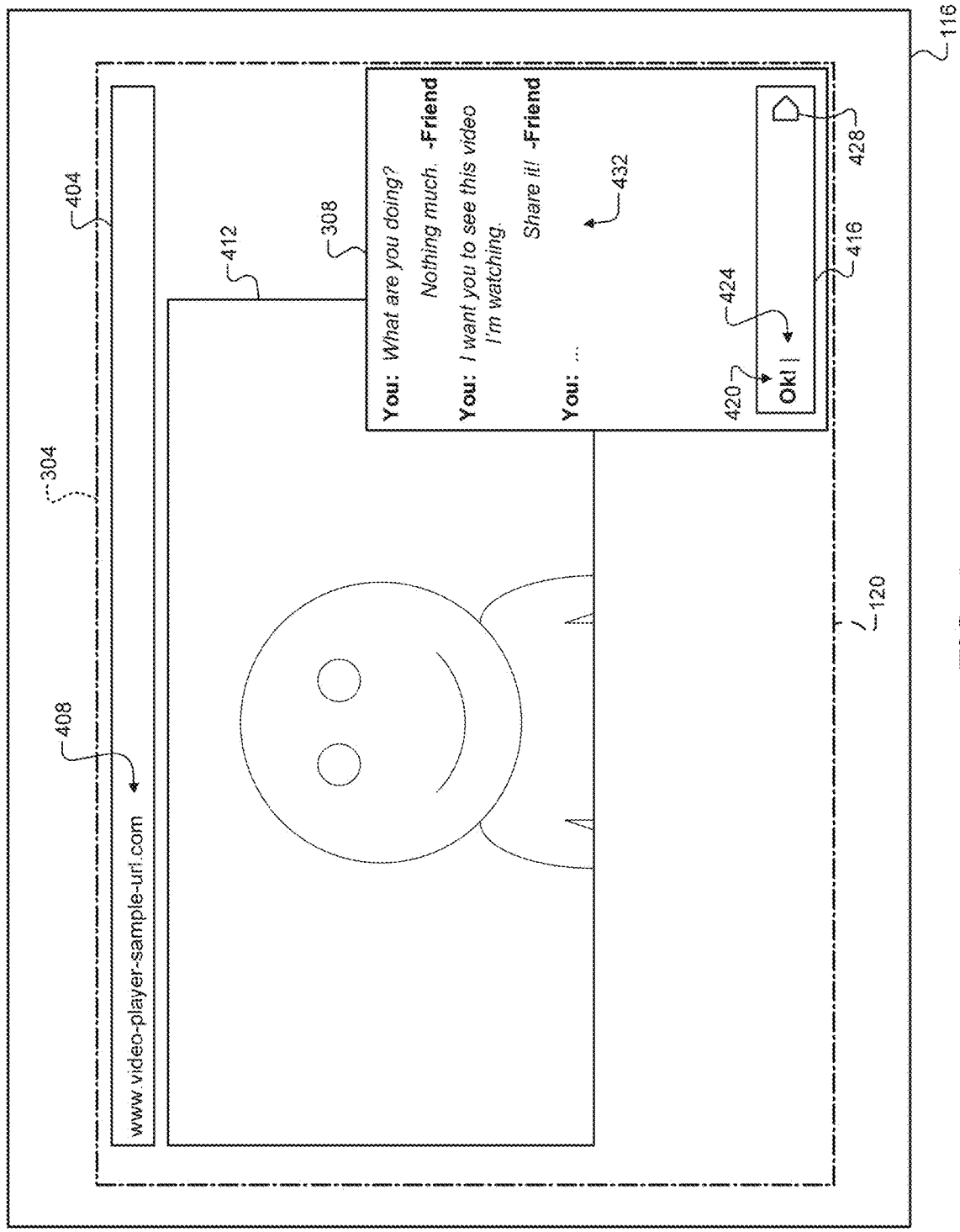
FIG. 4 is a view of a display of the example computing device of FIG. 1. displaying a chat application user interface in a first state according to some implementations of the present disclosure.
Figure 5:
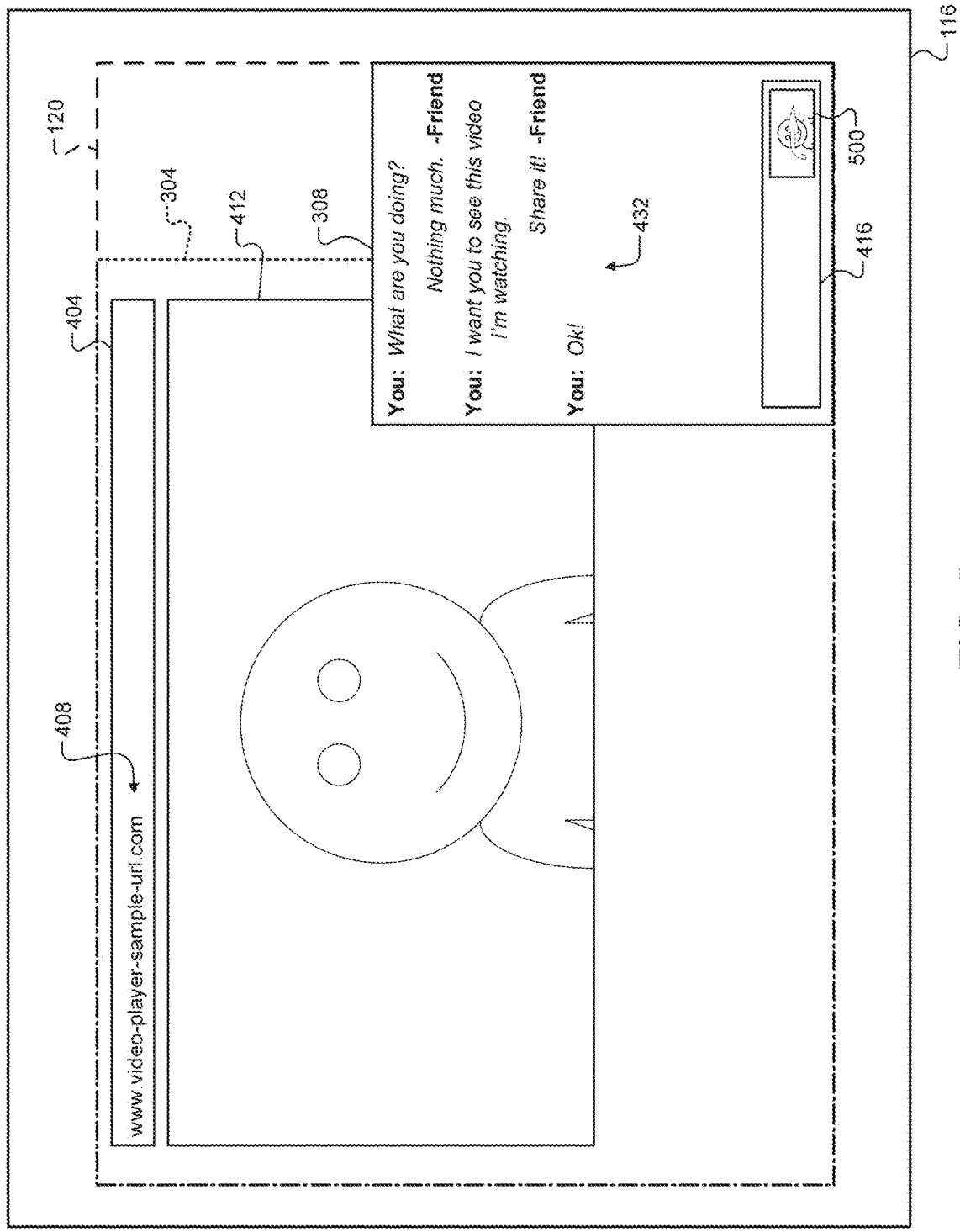
FIG. 5 is a view of a display of the example computing device of FIG. 1. displaying a chat application user interface in a second state according to some implementations of the present disclosure.

Referring now to FIGS. 4 and 5, two diagrams of similar but different configurations of the display 116 of the example computing device 104 are illustrated. In FIG. 4, the non-chat application 304 is illustrated as a window that fills the entirety of the display area 120 of the display 116. Further, the chat application user interface 308 overlays the non-chat application 304, occupying a lower right portion of display area 120. In FIG. 5, the non-chat application 304 is illustrated as a window that fills a portion and not the entirety of the display area 120 of the display 116, and the chat application user interface 308 overlays a portion of the non-chat application 304 as well as an otherwise unoccupied portion of the display area 120. It should be appreciated that, while FIGS. 4 and 5 each show the chat application user interface 308 overlaying a portion of the non-chat application 304, the chat application user interface 308 and the non-chat application 304 may instead occupy completely separate portions of the display area 120, or even completely separate displays in the event that the computing device 104 has more than one display 116.

In FIGS. 4 and 5, the non-chat application 304 is illustrated as a web browser that includes an address bar 404 in which an example URL 408 ("www.video-player-sample-url.com") is displayed. The non-chat application 304 can also include shareable content 412, which in the illustrated example is a video. The illustrated chat application user interface 308 is shown as including a textual input portion 416 that is configured to receive text input 420 from a user 108. For example only, when a user selects the textual input portion 416, a cursor 424 may be displayed in an appropriate position of the textual input portion 416. The user 108 then may provide the text input 420 in any acceptable manner, e.g., via a keyboard 128 or even via the microphone 220 utilizing speech-to-text functionality of the computing device 104. When the user 108 selects a selectable text transmit indicator 428, the text input 420 can be transmitted to the other participant(s) of the chat communication session. A record 432 of the communication session can also be displayed in the chat application user interface 308, which displays the messages sent by the participants.

In some embodiments of the present disclosure, the chat application user interface 308 can be modified to provide a simple technique for transmitting the shareable content 412 of the non-chat application 304 with which the user 108 is interacting to other participants in the chat communication session. In the illustrated example, while the user 108 could type the URL (or copy and paste the URL) into the text input portion 416 of the chat application user interface 308, this tends to be a cumbersome and time consuming process that requires multiple steps and/or inputs from the user 108. As shown in FIG. 5, the chat application user interface 308 can be modified to include a selectable indicator 500 of the shareable content 412, e.g., by replacing the selectable text transmit indicator 428 with the selectable indicator 500 of the shareable content 412, as described more fully below.

The selectable indicator 500 of the shareable content 412 can comprise a thumbnail image that is representative of the shareable content 412. In the illustrated example of FIG. 5, the selectable indicator 500 is a thumbnail image representative of the video that comprises the shareable content 412 that also includes a superimposed arrow that represents the action (transmission) to take place when the selectable indicator 500 is selected by the user 108. It should be appreciated that the term "thumbnail image" includes not only a static, unchanging image, but also a plurality of individual static images that are switched (e.g., a .GIF or a video). In other embodiments, the selectable indicator 500 of the shareable content 412 can comprise another form of identifier that is representative of the shareable content 412, such as a URL 408 for the web page.

The present disclosure provides for the automatic insertion of the selectable indicator 500 of the shareable content 412 into the chat application user interface 308 when the user 108 is interacting with a non-chat application 304. For example only, a user 108 may have an on-going, real-time chat communication session with another user via a chat application (an instant message (IM) application, a SMS message application, etc.) being executed by the computing device 104. The chat application may output a chat application user interface 308 for display on the display 116. When the user 108 inputs text (such as text input 420) into the textual input portion 416, the selectable text transmit indicator 428 may be displayed in the chat application user interface 308 (FIG. 4). When the computing device 104 determines that the user 108 is interacting with a non-chat application 304, however, the chat application user interface 308 can alternatively or additionally display the selectable indicator 500 of the shareable content 412 of the non-chat application 304 (FIG. 5).

The computing device 104 can determine that the user 108 is interacting with the non-chat application 304 in any of one or more of a plurality of manners. In some embodiments, the computing device 104 determines that the user 108 is interacting with the non-chat application 304 when the computing device 104 receives a user input with respect to the non-chat application 304. The user input with respect to the non-chat application 304 can include any form of user input, specifically including, but not limited to, a determination by the computing device 104 that the user 108 is looking at the non-chat application 304, e.g., via eye-tracking or similar functionality.

Of particular note, the user input may comprise a selection of a portion of the display output of the non-chat application 304. For example only, the user 108 may be viewing a plurality of images via an image viewing application on his/her computing device 104. When the user 108 selects an image or images, e.g., by clicking on such image(s), the computing device 104 can determine that the user 108 is interacting with the non-chat application 304 (image viewing application) and infer that the user 108 may desire to share the image(s) (the shareable content 412) with another user with whom she/he is currently communicating via a chat application associated with the chat application user interface 308.

In this manner, the computing device 104 can determine the shareable content 412 (the image(s)) of the non-chat application 304 (image viewing application). The computing device 104 can also modify the chat application user interface 308 to include the selectable indicator 500 of the shareable content 412. This modification of the chat application user interface 308 can be performed automatically and without further user input upon determining that the user 108 is interacting with the non-chat application 304. Upon receiving a selection of the selectable indicator 500 (such as the user 108 clicking the selectable indicator 500), the computing device 104 can transmit the shareable content 412 of the non-chat application 304 to the other user with whom she/he is currently communicating via the chat application.

Alternatively or additionally, the computing device 104 can determine that the user 108 is interacting with the non-chat application 304 by designating the most recently utilized non-chat application 304 as being the application with which the user 108 is interacting. For example only, if a user 108 is interacting with a non-chat application 304 and desires to transmit the shareable content 412 of the non-chat application 304 to another user 108 via a chat application, the user 108 may initiate execution of, or switch the active application of the computing device 104 to, the chat application. Accordingly, the chat application will cause the chat application user interface 308 to be modified to include the selectable indicator 500 of the shareable content 412 automatically.

It should be appreciated that the above description of the user 108 initiating execution of, or switching the active application of the computing device 104 to, the chat application is meant to exclude a selection by the user 108 of an option or feature in the non-chat application 304 to launch the chat application, such as a "share" button and the like. Specifically, the above description of the user 108 initiating execution of, or switching the active application of the computing device 104 to, the chat application is meant to include only the initiation of or switching to the chat application by the user 108 interacting with the chat application itself, and not the non-chat application 304.

Furthermore, in various embodiments the computing device 104 can determine that the user 108 is interacting with the non-chat application 304 by executing a plurality of non-chat applications 304, determining a particular one of the plurality of actively executing non-chat applications 304 with which the user 108 is interacting, and assigning the particular one of the plurality of actively executing non-chat applications 304 as the non-chat application 304 with which the user 108 is interacting.

The non-chat application(s) 304 and the chat application associated with the chat application user interface 308 may individually or both be executed by a web browser executed at the computing device 104. For example only, the non-chat application 304 and the chat application associated with the chat application user interface 308 may be separate windows, separate tabs, etc. displayed by the web browser. In other embodiments, the non-chat application(s) 304 and the chat application associated with the chat application user interface 308 can be separate applications executed by the computing device 104.

As described above, the chat application user interface 308 can be modified to include a selectable indicator 500 of the shareable content 412 when the computing device 104 determines that the user 108 is interacting with a non-chat application 304. In some embodiments, the chat application user interface 308 can be modified by replacing the selectable text transmit indicator 428 (FIG. 4) with the selectable indicator 500 of the shareable content 412 (FIG. 5). For example only, the chat application user interface 308 can be modified by replacing the selectable text transmit indicator 428 (FIG. 4) with the selectable indicator 500 of the shareable content 412 when no text (such as, text input 420) is present in the textual input portion 416 of the chat application user interface 308. When the user 108 selects the selectable indicator 500, the chat application can transmit the shareable content 412 to the other user with whom the user 108 is communicating.

In various embodiments, when the user 108 inputs text to the textual input portion 416 of the chat application user interface 308, instead of selecting the selectable indicator 500, the computing device 104 can replace the selectable indicator 500 with a selectable text transmit indicator 428 (FIG. 4). In this manner, the computing device 104 can intuitively provide the user 108 with the appropriate option of transmitting a text communication or the shareable content 412 depending on whether the user 108 has provided a text input 420. These embodiments can be particularly useful when there is a limited display area 120 and/or there is a desire to provide a simple, less cluttered chat application user interface 308.

Utilizing the techniques above, a user 108*a* can utilize his/her associated computing device 104*a* to transmit a text communication (text input 420) and/or shareable content 412 of a non-chat application 304 to another computing device 104*b* associated with another user 108*b* via a chat application associated with a chat application user interface 308. The transmission of the text communication and/or shareable content 412 can be performed in any acceptable manner. In some embodiments, for example, when the shareable content 412 comprises an image or plurality of images (such as a video or .GIF), the computing device 104a can transmit the shareable content 412 by embedding the shareable content (image, video, .GIF, etc.) in the chat application/chat application user interface 308. In this manner, the shareable content 412 can be displayed in the record 432 of the communication session of the chat application user interface 308.

Figure 6:
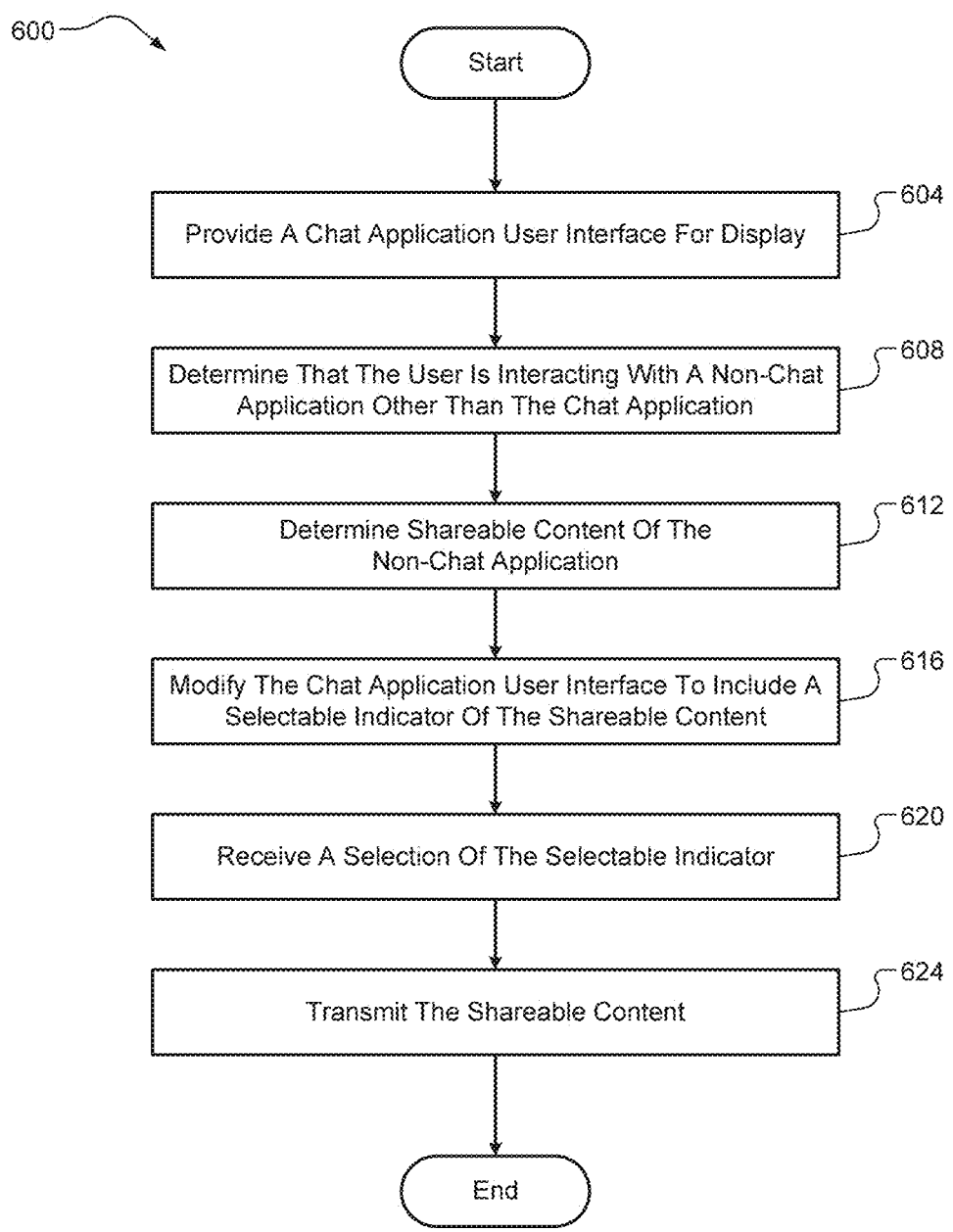
FIG. 6 is a flow diagram of an example technique for inserting shareable content of a non-chat application into a chat application user interface according to some implementations of the present disclosure.

Referring now to FIG. 6, a flow diagram of an example technique 600 for inserting shareable content 412 of a non-chat application 304 into a chat application user interface 308 is illustrated. For ease of description, the technique 600 will be described in reference to being performed by a computing device 104, but it should be appreciated that the technique 600 can be performed by a single computing device 104, two or more computing devices 104 operating in a parallel or distributed architecture, and/or any one or more particular components of one or a plurality of computing devices 104.

At 604, the computing device 104 provides a chat application user interface 308 for display. As mentioned above, the chat application user interface 308 can be associated with a chat application that provides real-time chat communication between a user 108 of the computing device 104 and another user of another computing device. The computing device 104 can determine that the user 108 of the computing device 104 is interacting with a non-chat application 304 other than the chat application associated with the chat application user interface 308 at 608.

At 612, the computing device 104 can determine the shareable content 412 of the non-chat application 304 and, at 616, can modify the chat application user interface 308 to include a selectable indicator 500 of the shareable content 412. At 620, the computing device 104 can receive a selection of the selectable indicator 500 of the shareable content 412. In response to receiving the selection of the selectable indicator 500, at 624 the computing device 104 can transmit the shareable content 412 to the other user of the other computing device via the chat application associated with the chat application user interface 308. The technique 600 can then end or return to 604 for one or more additional cycles.

While the techniques of the present disclosure have been described above in the context of a chat application and real-time chat communication, it should be appreciated that these techniques are equally applicable to other forms of electronic communication. For example only, instead of merely a chat application, these techniques could be applied in the context of an email application, or any other form of electronic communication. Thus, in the above description, a "non-chat application 304" can instead be described as a "non-electronic communication application" if such other forms of electronic communication are not interpreted to comprise a "chat application" as described.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC), an electronic circuit; a combinational logic circuit; a field programmable gate array (FPGA), a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
   providing, by a processing device, a chat application user interface for display, wherein the chat application user interface facilitates a chat communication session between a first user of a first computing device and a second user of a second computing device;
   determining, by the processing device, whether the first user is interacting with a non-chat application presenting shareable content;
   responsive to determining that the first user is interacting with the non-chat application presenting the shareable content, modifying, by the processing device, the chat application user interface to include a selectable indicator that is representative of the shareable content; and
   in response to receiving a user interaction with the selectable indicator that is representative of the shareable content, causing the shareable content to be shared with the second user.

2. The method of claim 1, wherein the chat application user interface comprises a textual input portion configured to receive text input, and wherein modifying the chat application user interface to include the selectable indicator of the shareable content comprises including the selectable indicator of the shareable content in the textual input portion.

3. The method of claim 1, wherein causing the shareable content to be shared with the second user comprises transmitting a request to share the shareable content.

4. The method of claim 1, wherein causing the shareable content to be shared with the second user comprises transmitting the shareable content to the second computing device.

5. The method of claim 1, further comprising: identifying the shareable content in response to detecting a user interaction by the first user with the non-chat application.

6. The method of claim 1, further comprising:
   displaying a user interface of the non-chat application and the chat application user interface on a display.

7. The method of claim 1, wherein the shareable content comprises non-text content.

8. The method of claim 1, wherein the user interaction with the selectable indicator of the shareable content comprises a selection of the selectable indicator of the shareable content by the first user.

9. A system comprising:
   a memory; and
   a processing device operatively coupled to the memory, the processing device to:
      provide a chat application user interface for display, wherein the chat application user interface facilitates a chat communication session between a first user of a first computing device and a second user of a second computing device;
      determine whether the first user is interacting with a non-chat application presenting shareable content;
      responsive to determining that the first user is interacting with the non-chat application presenting the shareable content, modify the chat application user interface to include a selectable indicator that is representative of the shareable content; and in response to receiving a user interaction with the selectable indicator of the shareable content, cause the shareable content to be shared with the second user.

10. The system of claim 9, wherein the chat application user interface comprises a textual input portion configured to receive text input, and wherein, to modify the chat application user interface to include the selectable indicator of the shareable content, the processing device is further to include the selectable indicator of the shareable content in the textual input portion.

11. The system of claim 9, wherein, to cause the shareable content to be shared with the second user, the processing device is further to transmit the shareable content to the second computing device.

12. The system of claim 9, wherein the processing device is further to:

detect a user interaction by the first user with the non-chat application; and identify the shareable content in response to detecting the user interaction.

13. The system of claim 9, wherein the processing device is further to:

display a user interface of the non-chat application and the chat application user interface on a display.

14. The system of claim 9, wherein the shareable content comprises non-text content.

15. The system of claim 9, wherein the user interaction with the selectable indicator of the shareable content comprises a selection of the selectable indicator of the shareable content by the first user.

16. A non-transitory machine-readable storage medium including instructions that, when accessed by a processing device, cause the processing device to:

provide a chat application user interface for display, wherein the chat application user interface facilitates a chat communication session between a first user of a first computing device and a second user of a second computing device;

determine whether the first user is interacting with a non-chat application presenting shareable content;

responsive to determining that the first user is interacting with the non-chat application presenting the shareable content, modify the chat application user interface to include a selectable indicator that is representative of the shareable content; and in response to receiving a user interaction with the selectable indicator of the shareable content, cause the shareable content to be shared with the second user.

17. The non-transitory machine-readable storage medium of claim 16, wherein the chat application user interface comprises a textual input portion configured to receive text input, and wherein, to modify the chat application user interface to include the selectable indicator of the shareable content, the processing device is further to include the selectable indicator of the shareable content in the textual input portion.

18. The non-transitory machine-readable storage medium of claim 16, wherein, to cause the shareable content to be shared with the second user, the processing device is further to transmit the shareable content to the second computing device.

19. The non-transitory machine-readable storage medium of claim 16, wherein the processing device is further to:

detect a user interaction by the first user with the non-chat application; and identify the shareable content in response to detecting the user interaction.

20. The non-transitory machine-readable storage medium of claim 16, wherein the shareable content comprises non-text content.

* * * * *